(12) United States Patent
Calkin et al.

(10) Patent No.: US 8,161,324 B2
(45) Date of Patent: Apr. 17, 2012

(54) ANALYSIS RESULT STORED ON A FIELD REPLACEABLE UNIT

(75) Inventors: Howard Calkin, Davis, CA (US); Andrew C. Walton, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 12/641,091

(22) Filed: Dec. 17, 2009

(65) Prior Publication Data

US 2011/0154115 A1 Jun. 23, 2011

(51) Int. Cl.
*G06F 11/00* (2006.01)
(52) U.S. Cl. .......................................... 714/26; 714/27
(58) Field of Classification Search .................. None
See application file for complete search history.

(56) References Cited

U.S. PATENT DOCUMENTS

| | | | |
|---|---|---|---|
| 5,068,851 A * | 11/1991 | Bruckert et al. ............... | 714/25 |
| 5,404,503 A * | 4/1995 | Hill et al. ....................... | 714/31 |
| 6,892,159 B2 | 5/2005 | Weiss et al. | |
| 7,131,030 B2 | 10/2006 | Gilstrap et al. | |
| 2002/0023181 A1 * | 2/2002 | Brown et al. ...................... | 710/8 |
| 2003/0216881 A1 * | 11/2003 | Weiss et al. .................... | 702/130 |
| 2003/0217247 A1 * | 11/2003 | Abramovitz et al. ......... | 711/173 |
| 2003/0217256 A1 * | 11/2003 | Gilstrap et al. ............... | 713/100 |
| 2004/0153686 A1 * | 8/2004 | Gilstrap et al. .................... | 714/1 |
| 2004/0162945 A1 * | 8/2004 | King et al. .................... | 711/122 |
| 2005/0283342 A1 * | 12/2005 | Swanson et al. .............. | 702/187 |
| 2006/0212752 A1 * | 9/2006 | Mechalke et al. ................ | 714/7 |

* cited by examiner

*Primary Examiner* — Gabriel Chu

(57) ABSTRACT

A system and method for recording fault information in an electronic system are disclosed herein. A system includes fault analysis logic and a plurality of field replaceable units ("FRUs"). The fault analysis is configured to analyze system error information, and identify at least one of the FRUs in the system to be a possible cause of a detected fault based on the analysis. Each FRU includes writeable non-volatile storage including storage locations reserved to store information including a result of the analysis. The result of the analysis indicates a reason that the FRU storing the information was determined, by the fault analysis logic, to be a possible cause of the fault.

19 Claims, 3 Drawing Sheets

ANALYSIS RESULT STORED ON A FIELD REPLACEABLE UNIT

BACKGROUND

Hardware devices, such as integrated circuits, in server computers and other electronic systems sometimes fail after the systems have been put into service. When a hardware failure occurs, the faulty device must be identified and replaced as quickly as possible to minimize system down time. Information regarding the symptoms of a detected fault, and the reasons why a particular device was chosen for replacement can be valuable system design and troubleshooting aids when provided to a system manufacturer or system service organization.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
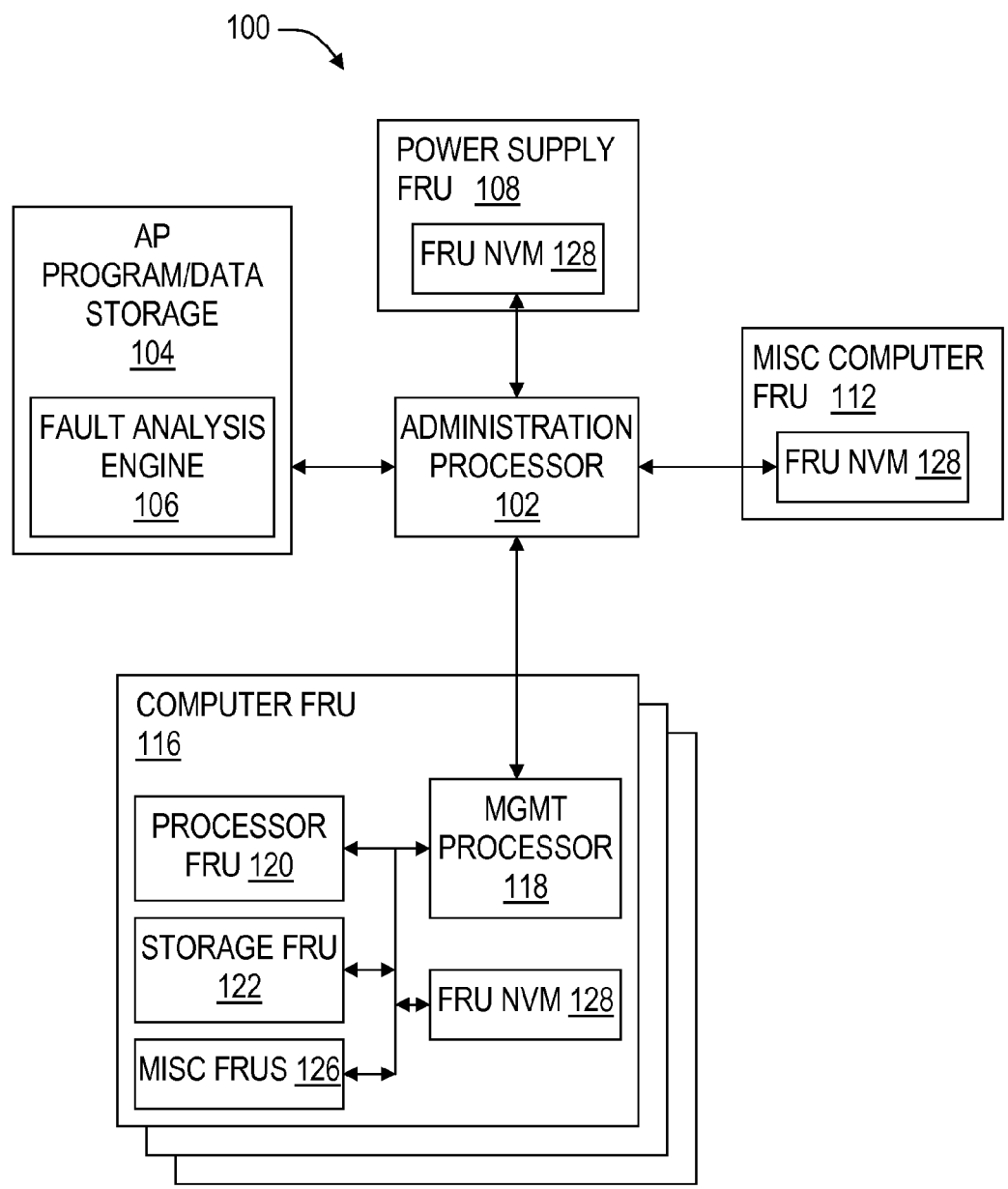
FIG. 1 shows a block diagram of a computer system configured to store fault information on a field replaceable unit ("FRU") selected for replacement in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

A field replaceable unit ("FRU") is a device or assembly that can be replaced at an operating location of a system in which the FRU is installed (i.e., in the field). A FRU can be replaced quickly and easily without transporting an upper level assembly including the FRU to a repair location to perform the replacement.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Electronic system manufacturers build fault management tools based on failure models that predict how often devices in a system fail. Unfortunately, it is difficult to determine how accurate these failure models are after a system is shipped. Service personnel are under pressure to replace defective parts as quickly as possible, and often lack the time to gather failure data. Consequently, devices replaced in the field are often returned without supporting documentation.

Lack of fault documentation with a returned device can produce a variety of undesirable consequences. The returned device must be extensively tested to try to determine whether the device is actually defective. If testing fails to identify a fault, for example, if the fault is intermittent or the device test suite has not been designed to exercise the device in a way that causes the fault to occur, then the device may be returned to service as a replacement part. In such a situation, an opportunity to remove a defective part from service and to improve system and device failure models is lost.

Embodiments of the present disclosure ensure that failure information is supplied with each field replaceable unit ("FRU") returned to the manufacturer by writing the failure information to a non-volatile storage device on the FRU. A fault analysis system of a server computer analyzes server error information and determines which FRUs are most likely to have caused a detected fault. For each selected FRU, the analysis system writes information detailing the symptoms of the detected fault and the reasons for selecting the FRU to non-volatile memory on the FRU.

FIG. 1 shows a block diagram of a computer system 100 configured to store fault information on a FRU selected for replacement in accordance with various embodiments. The computer system 100 (e.g., a server computer) includes an administration processor 102, a fault analysis engine 106, and a variety of FRUs.

A plurality of computer FRUs 116 are shown in FIG. 1, but embodiments of the computer system 100 may include any number of computer FRUs. In some embodiments, the computer FRU 116 is a blade computer. Blade computers are modularized computers configured for installation in a blade enclosure. A blade enclosure may support multiple blade computers, and the computer system 100 may include one or more enclosures.

Each computer FRU 116 includes a plurality of components and sub-FRUs. A FRU non-volatile memory ("NVM") 128 stores information about the computer FRU 116. The FRU NVM 128 may be a FRU Identifier memory. Embodiments of the present disclosure store fault information and FRU location information in the FRU NVM 128 to ensure that information indicating why a FRU was selected for replacement is provided to the computer/FRU manufacturer or servicer. The FRU NVM 128 may be implemented using an electrically erasable programmable read only memory ("EEPROM"), a FLASH memory, a ferro-electric random access memory, a magnetic random access memory, phase-change random access memory or any other in system writeable non-volatile memory technology.

Some embodiments of the computer FRU 116 include a management processor 118. The management processor 118 provides configuration and control services for the computer FRU 116. For example, the management processor 118 may be configured control selected hardware devices. In some embodiments, the management processor 118 can read and/or write to the FRU NVM 128. In embodiments of the computer FRU 116 not including the management processor 118, the FRU NVM 128 may be written and/or read by the administration processor 102 or another processor.

Sub-FRUs are field replaceable components of a higher level FRU. A processor FRU 120 includes one or more system processors configured to execute software programming. The storage FRU 122 is a computer-readable medium and may include volatile or non-volatile semiconductor memory, magnetic storage, or optical storage. A dual in-line memory module is an exemplary storage FRU 122. A portion of storage FRU 122 is accessible to the system processors of the processor FRU 120. Some embodiments of the storage FRU 122 include forward error correction that corrects some faulty data provided from the storage devices included in the storage FRU 122. Software programming executable by the system processors of the processor FRU 120 may be included in the storage FRU 122. Misc FRUs 126 includes various other sub-FRUs of the computer FRU 116, such as communication modules, interface modules, etc. Each sub-FRU of the computer FRU 116 (e.g., processor FRU 120, storage FRU 122, Misc FRUs 126) may include a FRU NVM 128 accessed by the management processor 118 or another processor, and configured to store fault and location information.

An administration processor 102, also known as an onboard administrator, provides high-level services to the computer system 100. The administration processor 102 provides a point of control for performance of various management tasks, such as configuration of the computer components, control of computer power and cooling systems, and computer level communication. In some embodiments, the administration processor 102 is coupled to the processor FRUs 116 and other FRUs of the computer system 100 by a dedicated communication link (i.e., a communication link reserved for computer management and control communications), thereby allowing communication between the administration processor 102 and the various FRUs 116, 108, 112, etc. when system level communications are disrupted.

The administration processor 102, the management processor 118 and the processors of the processor FRU 120 may be, for example, general-purpose processors, digital signal processors, microcontrollers, etc. Processor architectures generally include execution units (e.g., fixed point, floating point, integer, etc.), storage, instruction decoding, peripherals (e.g., interrupt controllers, timers, direct memory access controllers, etc.), input/output systems (e.g., serial ports, parallel ports, etc.) and various other components and sub-systems.

As mentioned above the administration processor 102 can monitor and control computer system 100 components. The power supply FRU 108, under administration processor 102 control, provides power consumed by the computer system 100 components. The power supply FRU 110 includes a FRU NVM 128 for storage of fault and location information.

Misc computer FRU 112 represents other FRUs monitored and controlled by the administration processor 102. In some embodiments, the Misc computer FRU 112 is a thermal control device, for example, a fan. The administration processor 102 can control when and/or at what speed a fan operates. The misc computer FRU 112 may include a FRU NVM 128 for storage of fault and location information.

The administration processor program/data storage module 104 is a computer-readable medium coupled to the administration processor 102. The storage 102 may be volatile or non-volatile semiconductor memory, magnetic storage, or optical storage. Some embodiments of the storage 104 include forward error correction that corrects some faulty data provided from the storage 104. Software programming executable by the administration processor 102 may be included in the storage 104.

Fault analysis engine software 106 is stored in the program/data storage 104 for execution by the administration processor 102. The fault analysis engine 106 is based on a failure model that predicts how and why computer 100 components fail. When a fault is detected in the computer 100, the administration processor 102 retrieves error logs from the computer FRUs 116, and other FRUs 108, 112 and components of the computer 100. All information in the computer 100 that is relevant to the fault is gathered and bundled to form a single consolidated error log. The consolidated error log is provided to the fault analysis engine 106 for processing.

The fault analysis engine 106 applies rules derived from the failure model to recognize patterns in the data of the consolidated error log that indicate symptoms of a faulty FRU. Based on the symptoms recognized, the fault analysis engine 106 identifies one or more FRUs as a likely cause of the fault. Some of the identified FRUs may be targeted for replacement. The fault analysis engine 106 causes the administration processor to write a fault record to the FRU NVM of each identified FRU indicating a reason that the FRU was selected for replacement. The information includes a fault symptom recognized by analysis of the consolidated error log, and may further include identification of a sub-component of the FRU that may have been the root cause of the fault. The size as well as the content of the fault record written to different FRUs can differ. For example, different FRUs may include FRU NVMs 128 of different sizes. The fault analysis engine 106 is aware of such differences and adjusts the size and content of the fault record accordingly. Embodiments of the FRU NVM 128 provide storage for a plurality of fault records that compose a fault history of a FRU.

The fault record can also indicate that a FRU previously identified as a likely cause of a fault has been determined not to have caused the fault and therefore is no longer identified for replacement. The administration processor 102 may write such a fault record to the FRU NVM based on detection of a repair action indicating that the FRU is believed to be healthy, or based on an indication that different FRU has been identified as the root cause of the fault. For example, if the storage FRU 122 is considered faulty, and the computer FRU 116 is removed from and later reinstalled in the computer 100, the administration processor 102 may conclude that the storage FRU 122 is has been found to be functional. Based on the detected reinstallation, the administration processor 102 may write a fault record to the FRU NVM of the storage FRU 122 indicating that the storage FRU 122 is no longer considered faulty. The fault record may also provide a reason that the storage FRU 122 is no longer considered faulty, for example, the reinstallation of the parent FRU 116.

The administration processor 102 also tracks the location of each FRU in the computer system 100. The administration processor 102 writes location records to the FRU NVM of each FRU, thereby creating a history of FRU installation locations. If a FRU is moved from one installation location to another within the computer 100, a location record is written to the FRU NVM 128 of the computer FRU 116 to document the location change. The location record may include, for example, a serial number of the computer system 100, a serial number of the computer FRU 116, an installation location on the computer FRU 116, and/or a time of installation. Embodiments of the FRU NVM 128 provide storage for a plurality of location records.

When a faulty FRU is extracted from the computer system 100 and returned to the manufacturer, the fault and location information is read from the FRU NVM 128. The fault and location information may be used to guide testing and diagnosis of the FRU 116, and to revise a failure model. Based on the revised failure model, the analysis rules applied by the fault analysis engine 106 may be revised to allow the fault analysis engine 106 to diagnose faults more accurately.

Figure 2:
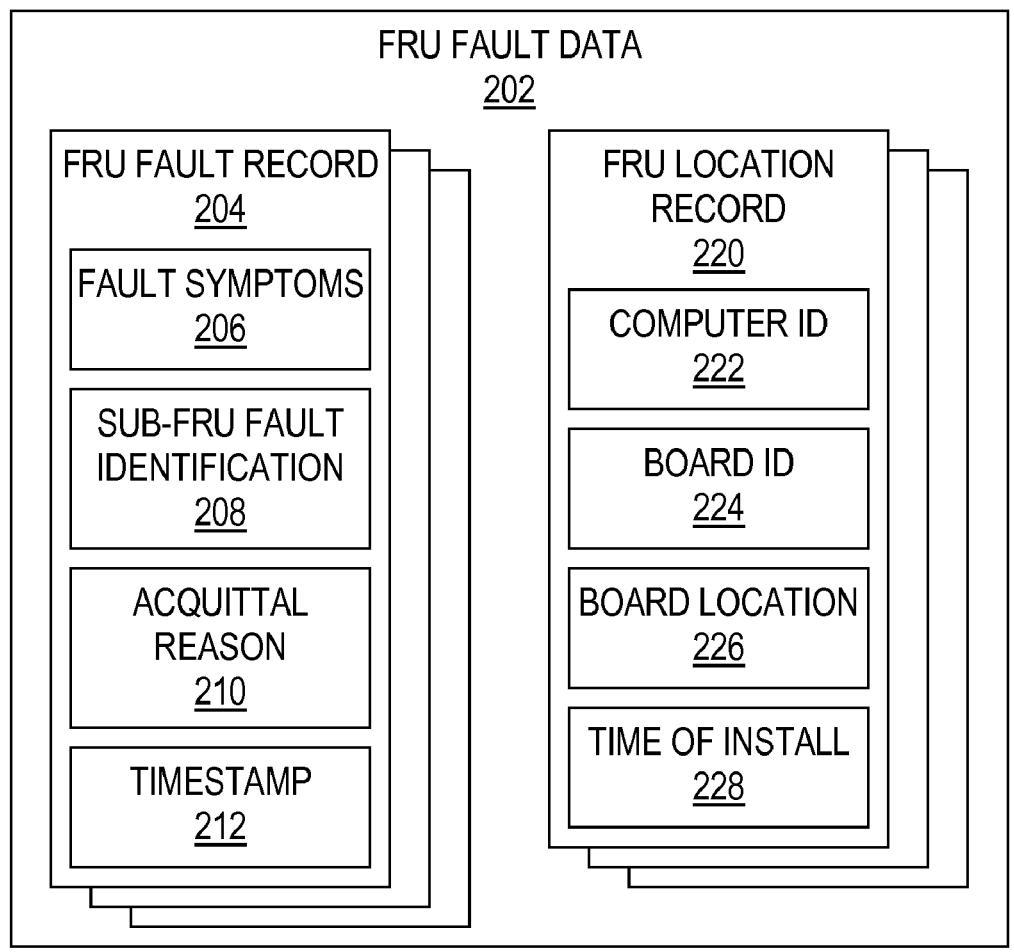
FIG. 2 shows fault data stored on a FRU selected for replacement in accordance with various embodiments.

FIG. 2 shows fault data stored in a FRU selected for replacement in accordance with various embodiments. A portion of the FRU NVM 128 reserved for storage of FRU fault data 202. The FRU fault data can include a plurality of FRU fault records 204 and a plurality of FRU location records 220.

The FRU fault record 204 communicates a reason that the fault analysis engine 106 has determined that a FRU is likely to have caused a detected fault. The fault symptoms 206 are derived from analysis of information retrieved from error logging and operational systems of the computer system 100. The fault analysis engine 106 applies failure model based rules to the information to correlate the information to symptoms of FRU failure. FRUs are identified for replacement based on the determined symptoms. A sub-FRU fault identification field 208 may be included to isolate the fault to specific a component of the FRU believed to be defective. For example, a specific integrated circuit of the FRU may be identified.

If after having been tagged for replacement, the FRU is found to be not responsible for the fault (i.e., the FRU is acquitted of causing the fault), then a fault record 204 specifying an acquittal reason (i.e., a reason why the FRU is believed not to be responsible for the fault) may be written to the FRU NVM 128.

The fault record 204 may further include a timestamp indicating the time of a fault occurrence, time of acquittal, etc.

The FRU location record 220 indicates where the FRU is located. The administration processor 102 monitors FRUs in the computer system 100, and is therefore aware of removal and/or installation of FRUs in the computer 100. An embodiment of the location record 220 includes a computer identification field 222 that identifies the computer in which the FRU is installed. The computer identification field 222 may record, for example, the serial number of the computer system 100. A board identification field 224 identifies a board of the computer system 100 in which the FRU is installed. The board identification field 224 may record, for example, the serial number of a computer FRU 116 board in which the FRU is installed.

The FRU location record 220 also includes a board location field 226. The board location field 226 specifies a location on the identified board where the FRU is installed. For example, the board location field 226 may specify a particular socket or integrated circuit location of the computer FRU 116 where the FRU is installed. A time of installation field 228 records a time at which the administration processor 102 found the FRU installed at the location specified in the FRU location record 220.

Figure 3:
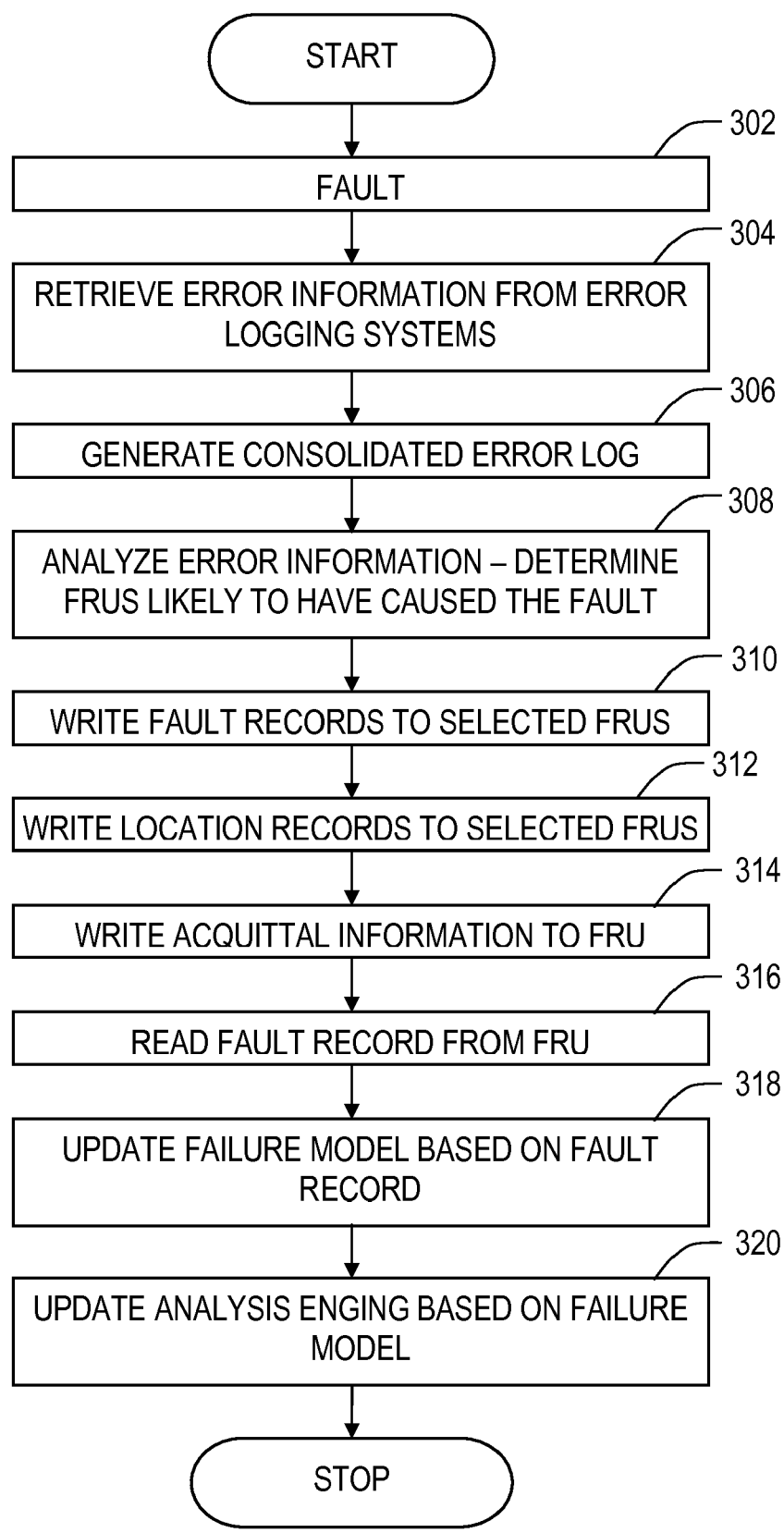
FIG. 3 shows a flow diagram for a method for handling faults in a computer system that stores fault information on a FRU selected for replacement in accordance with various embodiments.

FIG. 3 shows a flow diagram for a method for handling faults in a computer system that stores fault information on a FRU selected for replacement in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer readable medium and executed by a processor.

In block 302, the computer system 100 is operational and performing processing operations. A hardware fault is detected by one or more systems of the computer system 100. A detected hardware fault may include, for example, a memory error or error related to a processor, circuitry, or device of the computer system 100. A detected fault may be correctable or uncorrectable. Responsive to the fault, error logging systems of the computer system 100 collect error information. Error information may be collected by the processors of the processor FRU 116, management processor 118, administration processor 102, and other computer 100 systems. The error logging systems organize the collected error information into error logs.

In block 304, the administration processor 102 retrieves the collected error information from the various error logging systems. The administration processor 102 bundles the error information to form a consolidated error log that includes all information available in the computer 100 that is relevant to determining a root cause of the detected fault in block 306.

In block 308, the administration processor 102 executes the fault analysis engine 106 to determine which FRUs of the computer system 100 are likely to have caused the fault. The fault analysis engine 106 applies rules derived from a failure model to recognize patterns in the data of the consolidated error log that indicate symptoms. Based on the symptoms recognized, the fault analysis engine 106 identifies one or more FRUs as a likely cause of the fault. The identified FRUs are targeted for replacement.

In block 310, the administration processor 102 writes a fault record 204 to the FRU NVM 128 of FRUs identified as likely to have caused the fault. The fault record 204 includes symptoms of the fault derived from analysis of the error information. Different FRU NVMs may reserve different amounts of storage space for fault records. The administration processor is aware of such differences in FRU NVMs and accordingly may write fault records of different size and composition to different FRUs.

In block 312, the administration processor 102 writes a location record 220 to the FRU NVM. The administration processor 102 writes the location record 220 based on determining that a FRU has been installed in the computer system 100.

In block 314, the administration processor 102 determines that a FRU previously determined to be a likely cause of the detected fault did not cause the fault. The administration processor 102 writes acquittal information 210 to the FRU NVM 128. The acquittal information 210 specifies a reason for the acquittal of the FRU.

In block 316, the FRU is removed from the computer system 100 and the FRU fault data 202 is read from the FRU NVM 128 by, for example, the manufacturer of the computer 100. Based on the fault record 204, the manufacturer is able to determine why the FRU was believed to be faulty and removed from the computer 100. The FRU fault data 202 may be used to determine whether the FRU is defective and to revise FRU test programming.

In block 318, the FRU fault data 202 is incorporated in the computer system 100 failure model to improve FRU failure prediction. Based on the revised failure model, the symptom recognition rules applied by and included in the fault analysis engine 106 are updated to provide more effective identification of faulty FRUs in the computer system 100.

The above discussion is meant to be illustrative of the principles and various embodiments of the present invention. Numerous variations and modifications will become apparent to those skilled in the art once the above disclosure is fully appreciated. For example, while a computer system has been used as an example of a system using the FRU NVM 128 to record failure information, the techniques disclosed herein are equally applicable to other electronic systems and computer-based devices. It is intended that the following claims be interpreted to embrace all such variations and modifications.

What is claimed is:

1. A system, comprising:
    a plurality of field replaceable units ("FRUs"), each FRU including writeable non-volatile storage; and
    fault analysis logic configured to:
        analyze system error information, and based on the analysis, identify at least one of the FRUs as being a possible cause of a detected fault; and
        select a given FRU for replacement based on analysis of the information previously written to other FRUs;
    wherein storage locations of the non-volatile storage of each FRU are configured to store information comprising a result of the analysis indicating a reason that a FRU on which the information is stored was determined, by the fault analysis logic, to be a possible cause of the fault.

2. The system of claim 1, wherein the fault analysis logic is configured to select a given FRU as possibly causing the fault based on analysis of error data available in the system, and to write the information to the storage locations of the given FRU.

3. The system of claim 1, wherein the information indicates one or more of:
    a symptom of failure based on analysis of error data available in the system; and
    identification of a sub-portion of the given FRU that likely caused the given FRU to fail.

4. The compute system of claim 1, wherein each FRU comprises storage locations reserved to store a plurality of instances of the information.

5. The system of claim 1, wherein each FRU further includes mutable non-volatile storage locations reserved to store a plurality of location records; and wherein each location record indicates a location in the system at which the FRU has been installed.

6. The system of claim 5, wherein each location record comprises information indicating one or more of:
    identification of the system;
    identification of a board in the system in which the FRU was installed; and
    identification of a location on the board at which the FRU was installed.

7. The system of claim 1, wherein the information indicates a reason that the FRU has been determined to not be a cause of the detected fault, and wherein the fault analysis logic is configured to write the reason that the FRU has been determined to not be a cause of the detected fault to the storage locations of a given FRU based on an occurrence in the system indicating that a fault in the FRU has been corrected.

8. The system of claim 1, wherein the information is configured to update a failure model that identifies symptoms in error data.

9. A method, comprising:
    retrieving, by a processor of a computer system, error information from a plurality of error information sources in the computer;
    analyzing the error information to determine a given field replaceable unit ("FRU") of a plurality of FRUs in the computer to be a possible cause of a fault related to the error information;
    writing an information record indicating a reason that the given FRU was determined to be a possible cause of the fault to mutable non-volatile storage locations on the FRU reserved for storage of the record; and
    selecting the given FRU for replacement based on analysis of the information previously written to other FRUs.

10. The method of claim 9, further comprising writing to the storage locations, as part of the record, at least one of:
    a symptom of failure based on the analysis; and
    identification of a sub-portion of the given FRU that likely caused the given FRU to fail.

11. The method of claim 9, further comprising writing a plurality of different instances of the information record to the storage locations, each instance related to a different fault.

12. The method of claim 9, further comprising:
    determining that the given FRU has been installed in the computer system; and
    writing, based on the determining, a location record indicating a location in the computer occupied by the given FRU to mutable non-volatile storage locations on the FRU reserved for storage of the location record.

13. The method of claim 9, further comprising:
    detecting an occurrence in the computer indicating that a fault in the given FRU has been corrected;
    determining, based on the detecting, that the given FRU is not a cause of the fault; and
    writing to the storage locations of the given FRU, an instance of the information record including a reason that the given FRU has been determined to not be a cause of the fault.

14. The method of claim 9, further comprising enhancing an error analysis algorithm in the computer system that improves symptom recognition based on the information record written to the given FRU.

15. A non-transitory computer-readable medium encoded with a computer program comprising:
    instructions that when executed cause a processor of a computer system to:
    retrieve error information from a plurality of error information sources in the computer;
    analyze the error information to determine a given field replaceable unit ("FRU") of plurality of FRUs in the computer to be a possible cause of a fault related to the error information;
    write an information record indicating a reason that the given FRU was determined to be a possible cause of the fault to writeable non-volatile storage locations on the given FRU reserved for storage of the record; and
    select the given FRU for replacement based on analysis of the information previously written to other FRUs.

16. The computer-readable medium of claim 15, further comprising instructions that when executed cause the processor to:
    determine whether the given FRU has changed locations within the computer; and
    write, based on the determination, a location record indicating a location in the computer occupied by the given FRU to mutable non-volatile storage locations on the FRU reserved for storage of the location record.

17. The computer-readable medium of claim 16, further comprising instructions that when executed cause the processor to write as part of the location record one or more of:
    identification of the computer system;
    identification of a board in the computer system in which the given FRU was installed; and
    identification of a location on the board at which the given FRU was installed.

18. The computer-readable medium of claim 15, further comprising instructions that when executed cause the processor to:
- detect an occurrence in the computer indicating that the fault has been corrected;
- determine, based on the detection, that the given FRU is not a cause of the fault; and
- write to the storage locations of the given FRU, an instance of the information record including a reason that the given FRU has been determined to not be a cause of the fault.

19. The computer-readable medium of claim 15, further comprising instructions that when executed cause the processor to write as part of the information record one or more of:
- a symptom of failure based on the analysis of error information; and
- identification of a sub-portion of the given FRU that likely caused the given FRU to fail.

* * * * *

UNITED STATES PATENT AND TRADEMARK OFFICE
CERTIFICATE OF CORRECTION

PATENT NO. : 8,161,324 B2  
APPLICATION NO. : 12/641091  
DATED : April 17, 2012  
INVENTOR(S) : Howard Calkin et al.

Page 1 of 1

It is certified that error appears in the above-identified patent and that said Letters Patent is hereby corrected as shown below:

In the Specifications:

In column 3, line 46, delete "storage," and insert -- storage (e.g., registers, memory, etc.), --, therefor.

In column 3, line 53, delete "power" and insert -- power (e.g., voltage and current) --, therefor.

In column 4, line 59, delete "FRU" and insert -- FRU (e.g., computer FRU 116) --, therefor.

In column 4, line 60, delete "100," and insert -- 100 (or a different computer), --, therefor.

In column 5, line 1, delete "FRU" and insert -- FRU (e.g., computer FRU 116) --, therefor.

In column 6, line 6, delete "100." and insert -- 100 (e.g., a FRU). --, therefor.

In the Claims:

In column 7, line 33, in Claim 4, before "system" delete "compute".

Signed and Sealed this  
Sixteenth Day of July, 2013

Teresa Stanek Rea  
*Acting Director of the United States Patent and Trademark Office*